(12) United States Patent
Williams et al.

(10) Patent No.: US 7,746,999 B2
(45) Date of Patent: Jun. 29, 2010

(54) RESOURCE BASED QUEUE MANAGEMENT SYSTEM AND METHOD

(75) Inventors: Mark Williams, North Canton, OH (US); James Pavlic, Akron, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 1350 days.

(21) Appl. No.: 11/206,723

(22) Filed: Aug. 18, 2005

(65) Prior Publication Data

US 2007/0041565 A1    Feb. 22, 2007

(51) Int. Cl.
    H04M 3/00    (2006.01)
(52) U.S. Cl. .............................. 379/266.01; 379/265.02
(58) Field of Classification Search .................. 379/266, 379/265
    See application file for complete search history.

(56) References Cited

U.S. PATENT DOCUMENTS

| | | | |
|---|---|---|---|
| 5,371,787 A | 12/1994 | Hamilton | |
| 5,430,792 A | 7/1995 | Jesurum et al. | |
| 5,506,898 A | 4/1996 | Costantini et al. | |
| 5,581,602 A | 12/1996 | Szlam et al. | |
| 5,627,884 A | 5/1997 | Williams et al. | |
| 5,724,420 A | 3/1998 | Torgrim | |
| 5,828,731 A | 10/1998 | Szlam et al. | |
| 6,041,116 A | 3/2000 | Meyers | |
| 6,278,777 B1 | 8/2001 | Morley et al. | |
| 6,546,097 B1 | 4/2003 | Peltz | |
| 6,563,921 B1 | 5/2003 | Williams et al. | |
| 6,584,191 B1 | 6/2003 | McPartlan et al. | |
| 6,694,009 B1 | 2/2004 | Anderson et al. | |
| 6,728,363 B2 | 4/2004 | Lieberman et al. | |
| 6,741,689 B2 | 5/2004 | Burg | |

(Continued)

FOREIGN PATENT DOCUMENTS

EP    1 478 167    11/2004

OTHER PUBLICATIONS

Sharmistha Sarkar Das et al., Application of Automatic Speech Recognition in Call Classification, IEEE, 2002, pp. 3896-3899.

(Continued)

*Primary Examiner*—Curtis Kuntz
*Assistant Examiner*—Amal Zenati
(74) *Attorney, Agent, or Firm*—Renner, Otto, Boisselle & Sklar, LLP (57) ABSTRACT

A queue management system interfaces with a resource management system and a queuing system in an environment that further includes an interim system. The queue management system comprises an interface to the resource management system for obtaining resource availability data and a management system. The resource availability data represents a resource termination time—and may include the resource termination time or data useful for calculating the resource termination time. The control system: i) obtains a value representing the expected interim system handling time, and ii) makes the interim system available for handling a subject client only if the expected interim system handling time period terminates prior to the resource termination time. The control system transfers the subject client to the queuing system to hold while waiting for connection to a resource for handling upon determining that the resource termination time is scheduled to occur prior to termination of the expected interim system handling time period.

22 Claims, 6 Drawing Sheets

U.S. PATENT DOCUMENTS

| | | | |
|---|---|---|---|
| 6,748,060 | B2 | 6/2004 | Lee et al. |
| 6,754,332 | B1 | 6/2004 | Kneipp et al. |
| 6,754,334 | B2 | 6/2004 | Williams et al. |
| 6,766,013 | B2 | 7/2004 | Flockhart et al. |
| 6,829,331 | B2 | 12/2004 | Cullis |
| 6,850,602 | B1 | 2/2005 | Chou |
| 6,882,641 | B1 | 4/2005 | Gallick et al. |
| 6,898,190 | B2 | 5/2005 | Shtivelman et al. |
| 7,174,011 | B2 | 2/2007 | Kortum et al. |
| 2003/0083875 | A1 | 5/2003 | Brown et al. |
| 2004/0002865 | A1 | 1/2004 | Chan et al. |
| 2005/0129217 | A1 | 6/2005 | McPartlan et al. |
| 2006/0256949 | A1* | 11/2006 | Noble, Jr. .............. 379/265.01 |

OTHER PUBLICATIONS

Harry Levit, PhD, Noise Reduction in Hearing Aids: An Overview, Journal of Rehabilitation Research and Development, vol. 38, No. 1, Jan./Feb. 2001.

Steve Borne, Ringback Tones, Revenue at our Doorstep, Wireless Business and Technology, Oct. 6, 2004, www.sys-con.com.

Rednova, Globe Telecom's Ringback Tone Service Surpasses 100,000 Subscriber in the First Week of Launch, www.rednova.com, Apr. 27, 2004.

Sunmicrosystems, Ringback Tones help Carriers Dial Up New Profits, Boardroom Minutes, Aug. 2004, www.sun.com.

Jefferson Graham, Cell Phone Users Provide Musical Interlude for Callers, USA Today, Dec. 7, 2004, www.usatoday.com.

International Search Report for corresponding International Application No. PCT/US08/67080, dated Oct. 6, 2008.

Written Opinion for corresponding International Application No. PCT/US08/67080, dated Oct. 6, 2008.

International Search Report for corresponding International Application No. PCT/US08/075541, dated Feb. 26, 2009.

Written Opinion for for corresponding International Application No. PCT/US08/075541, dated Feb. 26, 2009.

U.S. Appl. No. 11/246,409, filed Oct. 7, 2005, for Automated System and Method for Distinguishing Audio Signals Received in Response to Placing and Outbound Call.

U.S. Appl. No. 11/820,253, filed Jun. 19, 2007, for Accessory Queue Management System and Method for Interacting With a Queuing System.

U.S. Appl. No. 11/901,186, filed Sep. 14, 2007, for Expected Wait Time System With Dynamic Array.

U.S. Appl. No. 11/143,857, filed Jun. 2, 2005, for Expected Wait Time Augmentation System and Method.

European Search Report for European Application No. 06816246.0, dated Apr. 7, 2009.

\* cited by examiner

| Call Back Table 70 ||
|---|---|
| Call Back Information 74 | Appropriate Time 76 |
| Call Back Information 1 | Time 1 |
| Call Back Information 2 | Time 2 |
| Call Back Information 3 | Time 3 |

72 { (rows)

RESOURCE BASED QUEUE MANAGEMENT SYSTEM AND METHOD

TECHNICAL FIELD

The present invention relates to managing the queuing of clients waiting to be connected to a resource for servicing. More particularly, the present invention relates to determining whether an interim system is available for servicing clients based on resource availability, and/or a scheduled change in resource availability, in a system wherein both a traditional queue and the interim system are available for handling of clients waiting to be connected to a resource.

BACKGROUND OF THE INVENTION

Automatic call director (ACD) technology is a well known technology that: i) accepts incoming calls from calling clients; ii) queues calling clients on-hold for connection to a service representative; and iii) when a service representative is available, connects the client from the queue to the available service representative.

One problem associated with ACD technology is that the amount of time a client waits in queue can be quite lengthy, particularly during times at which many clients are calling the call center. A client waiting on-hold without any knowledge of when he or she will be connected to a service representative can be exasperating.

Expected wait time systems have been developed which, as a courtesy, provide a calling client with a prediction of the time the client will need to wait in queue until a service representative is available. While this solution provides the calling client with information about the predicted wait time, it does not alleviate the problem associated with the client having to wait on-hold for an extended period of time.

In an effort to reduce customer exacerbation caused by having to maintain a connection while on-hold in queue, interim systems have been developed. Exemplary interim systems include systems which handle the client during the expected wait time. One example would be a system which interactively provides information to the customer on an automated basis.

Another example would be a call back system which obtains a telephone number at which the calling client can be reached at the end of the expected wait time. The client disconnects, and then, at the end of the expected wait time, the call back system establishes a connection to the client and couples the client to an available representative without waiting on-hold in queue. One exemplary system is disclosed in U.S. Pat. No. 6,563,921 to Williams et al. which is commonly assigned with the present application.

An advantage of a call back system as an interim system is that the system not only eliminates the requirement that the client remain connected on-hold in queue, but the system also reduces toll charges in a system wherein the call center is paying toll charges for clients on-hold in queue (e.g. clients who called-in on a toll free number).

One characteristic of using an interim system is that the client is not connected to a service representative until after the interim system has completed its handling of the client. In the example where the interim system is a call back system, the client is not connected to the service representative until: i) the expected wait time expires; and ii) the system calls the client and establishes a connection. This is not a problem during a typical business day because each service representative is continually handling clients from the queue until such time as the call back system establishes a connection with the client. In other words, no service representatives are idle waiting for the call back system to establish the connection.

However, waiting for an interim system to complete its handling of a client can be a problem as the end of a work day approaches. Typically, service representatives will stay past the time the call center "officially closes" to work through clients in queue. If clients have been directed to an interim system near the end of the business day, it is possible that the service representatives will complete handling of all clients in queue before the interim system completes its handling of those clients directed to the interim system. This would cause idle time while one or more service representatives wait for the interim system to complete its handling of clients.

Therefore, what is needed is a system and method for managing the queuing of clients waiting to be connected to a resource for servicing in a system wherein both a traditional queue and an interim system are available for handling of clients waiting to be connected to a resource. More particularly, what is needed is such a system that permits handling of clients by an interim system only if resources are expected to be available for handling at a time that the interim system would be expected to complete its handling of the client.

SUMMARY OF THE INVENTION

A first aspect of the present invention comprises a queue management system for interfacing with a resource management system and a queuing system in an environment that further includes an interim system.

The queue management system comprises an interface to the resource management system for obtaining resource availability data and a management system.

The resource availability data represents a resource termination time and may include the resource termination time or data useful for calculating the resource termination time.

The management system: i) obtains a value representing the expected interim system handling time period, and ii) makes the interim system available for handling the subject client only if the expected interim system handling time period terminates prior to the resource termination time. The expected interim system handling time period represents a time period that is expected to elapse before an interim system completes its handling of a subject client.

The management system transfers the subject client to the queuing system to hold while waiting for connection to a resource for handling upon determining that the resource termination time is scheduled to occur prior to termination of the expected interim system handling time period.

In one embodiment, the interim system may be a call back system. In which case, the expected interim system handling time period may be an expected wait time period associated with the subject client. The expected wait time period represents a time period that is expected to elapse before the subject client is connected to a resource for servicing—for example, the time period that is expected to elapse before the subject client is connected to a resource for servicing if the client waited in queue.

The call back system may: i) process a call to establish a connection to the subject client at a call back time derived from the expected wait time period; and ii) provide a priority connection to a resource for handling. Providing a priority connection to a resource for handling may include, in the case of a call center, transferring the subject client to the queuing system (or another system) with an indication that the subject client is to have priority for connection to a resource over those clients in queue or establishing a connection to a resource at a time proximate (before or after) to processing the call to the subject client and connecting the two.

The interim system or the queue management system may, upon client request to hold in queue, transfer the subject client to the queuing system to hold while waiting for connection to a resource for handling.

Upon client request for interim handling (whether before being transferred to the queuing system or while in the queuing system), the queue management system would, if the resource termination time is after the expected interim system handling time, transfer the client to the interim system for handling.

In an embodiment wherein the interim system is a call back system, the call back system would then: i) process a call to establish a connection to the subject client at a call back time derived from the expected wait time period; and ii) provide a priority connection to a resource for handling.

A second aspect of the present invention comprises a method for connecting a subject client to a resource. The method comprises: i) receiving a connection request from the subject client; ii) obtaining resource availability data, the resource availability data representing a resource termination time; iii) obtaining an value representing an expected interim system handling time period, the interim system handling time period represents a time period that is expected to elapse before an interim system completes its handling of the subject client, and iv) making an interim system available for handling the subject client only if the expected interim system handling time period terminates prior to the resource termination time.

The subject client is transferred to a queuing system to hold while waiting for connection to a resource for handling upon determining that the resource termination time is scheduled to occur prior to termination of the expected interim system handling time period.

Again, the interim system may be a call back system. In which case, the expected interim system handling time period may be an expected wait time period associated with the subject client and the call back system may: i) process a call to establish a connection to the subject client at a call back time derived from the expected wait time period; and ii) provide a priority connection to a resource for handling.

Again, the interim system or the queue management system may, upon client request to hold in queue, transfer the subject client to the queuing system to hold while waiting for connection to a resource for handling. Upon client request for interim handling (whether before being transferred to the queuing system or while in the queuing system), the queue management system would, if the resource termination time is after the expected interim system handling time, transfer the client to the interim system for handling.

In an embodiment wherein the interim system is a call back system, the call back system would then: i) process a call to establish a connection to the subject client at a call back time derived from the expected wait time period; and ii) provide a priority connection to a resource for handling.

A third aspect of the present invention is to provide a queue system for operation with a resource management system and an automated call director. The queue system comprising a queue management system and an interim system.

The queue management system: i) obtains resource availability data from the resource management system, the resource availability data representing a resource termination time; ii) obtains a value representing an expected interim system handling time period, the expected interim system handling time period representing a time period that is expected to elapse before an interim system completes its handling of a subject client; and iii) couples the subject client to a queue of the automated call director for waiting for connection to a resource for handling upon determining that the resource termination time is scheduled to occur prior to termination of the expected interim system handling time period.

The client may be coupled to the interim system for handling in the event the expected interim system handling time period is expected to elapse prior to the resource termination time.

Upon client request for interim handling (whether before being transferred to the queuing system or while in the queuing system), the queue management system would, if the resource termination time is after the expected interim system handling time, transfer the client to the interim system for handling.

In an embodiment wherein the interim system is a call back system, the expected interim system handling time period is an expected wait time associated with a subject client.

The call back system: i) monitors the passage of time; ii) processes a call to establish a connection to the subject client at a call back time derived from the expected wait time period; and iii) provides for a priority connection to a resource for handling at a time derived from the value representing the expected wait time if the expected wait time period terminates prior to the resource termination time.

The interim system or the management system may further, upon client request to hold in queue, transfer the subject client to the queue of the automated call director. Upon client request for interim handling (whether being transferred to the queuing system or while in the queuing system), the queue management system would, if the resource termination time is after the expected interim system handling time, transfer the client to the interim system for handling.

For a better understanding of the present invention, together with other and further aspects thereof, reference is made to the following description, taken in conjunction with the accompanying drawings. The scope of the present invention is set forth in the appended claims.

DETAILED DESCRIPTION OF THE EXEMPLARY EMBODIMENTS

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 1:
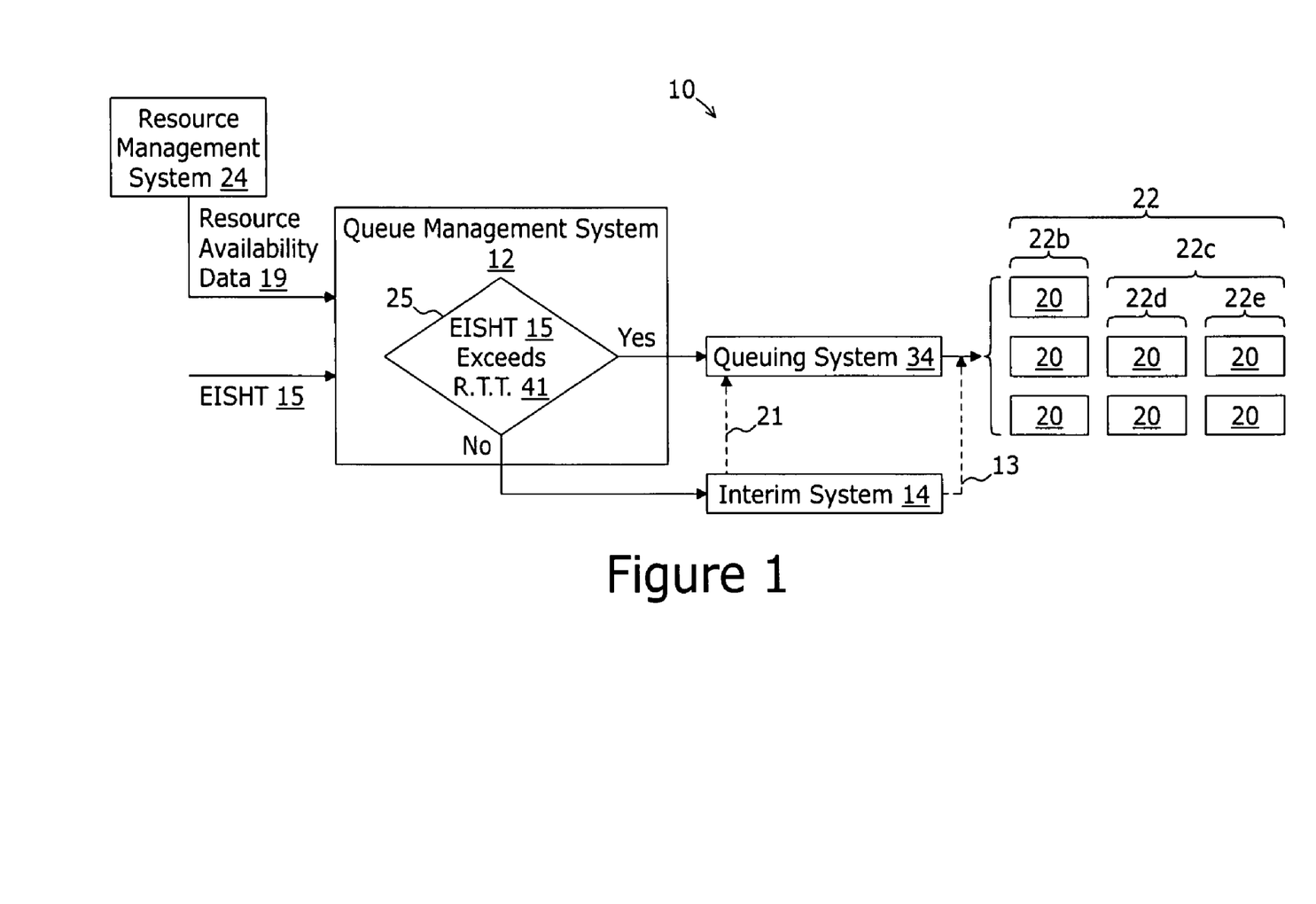
FIG. 1 is a block diagram representing an exemplary architecture for a system that includes a queue management system in accordance with one embodiment of the present invention.

FIG. 1 represents an overview of a system 10 which includes both a queuing system 34 and an interim system 14 for queuing of clients waiting to be connected to one of the resources 20.

In an exemplary embodiment, each of the resources 20 may be a service representative system for enabling a service representative to take a call from a client (not shown) and service the requests of clients. The resources 20 may be for a single group of resources or may be for resources 20 divided into resource groups 22 based on the skill set of the service representatives using the resources 20.

For example, each of the resources 20 may include similar structure for enabling a service representative to perform his or her duties, however, resource group 22b may be resources 20 which are operated by Spanish speaking service representatives while resource group 20c may be resources 20 operated by English speaking service representatives. Subgroup 22d may be resources 20 operated by English speaking service representatives with ability to help a client with billing inquiries and subgroup 22e may be recourses 20 operated by English speaking service representatives with ability to help a client with technical service issues.

A resource management system 24 may provide resource availability data 19 to the queue management system 12. The resource availability data 19 represents information useful for determining when a resources 20, or a particular group of resources 22 needed for handling a client; will be unavailable (e.g. the resource termination time 41).

A queue management system 12 makes the interim system available to service clients based on resource availability and/or a scheduled change in resource availability. More specifically, the queue management system 12 transfers a subject client to the interim system 14 for handling only if an expected interim system handling time period 15 for the subject client would terminate prior to resource termination time 41. Otherwise, if the resource termination time 41 is scheduled to occur prior to termination of the expected interim system handling period 15, the subject client is transferred to the queuing system 34 for handling by a resource in a traditional queued manner.

Figure 2:
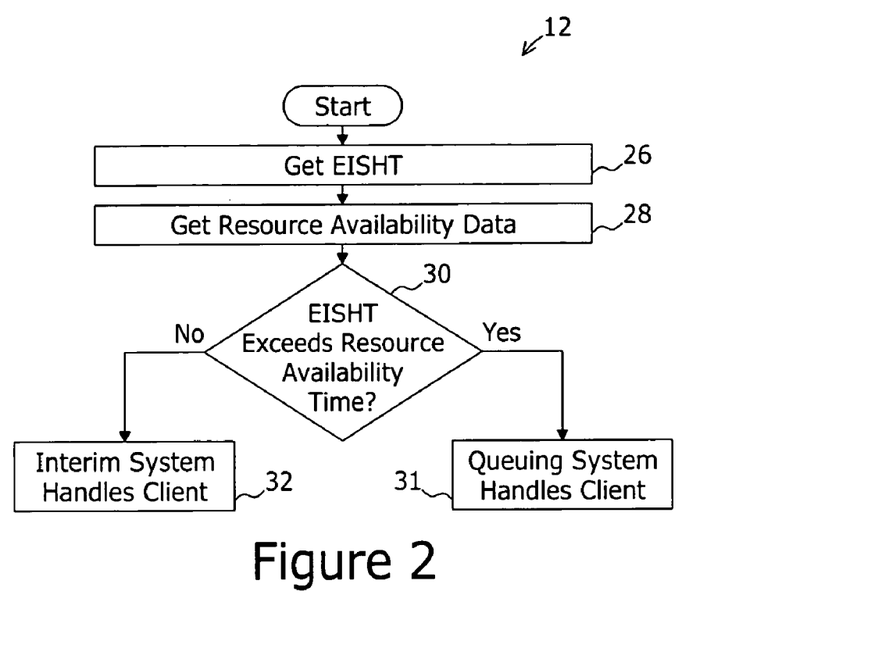
FIG. 2 is a flow chart representing a first aspect of exemplary operation of queue management system in accordance with an embodiment of the present invention.

The flow chart of FIG. 2 represents one example of operation of a queue management system 12. Referring to FIG. 2 in conjunction with FIG. 1, step 26 represents obtaining a value representing the expected interim system handling time period 15.

Step 28 represents obtaining resource availability data 19 from the resource management system 24. The resource availability data 19 may specify a resource termination time 41 for resources 20 or a group 22 of resources 20. Alternatively, the resource availability data 19 may be other data useful for calculating the resource termination time 41 for resources 20 or a group 22 of resources 20.

Figure 3:
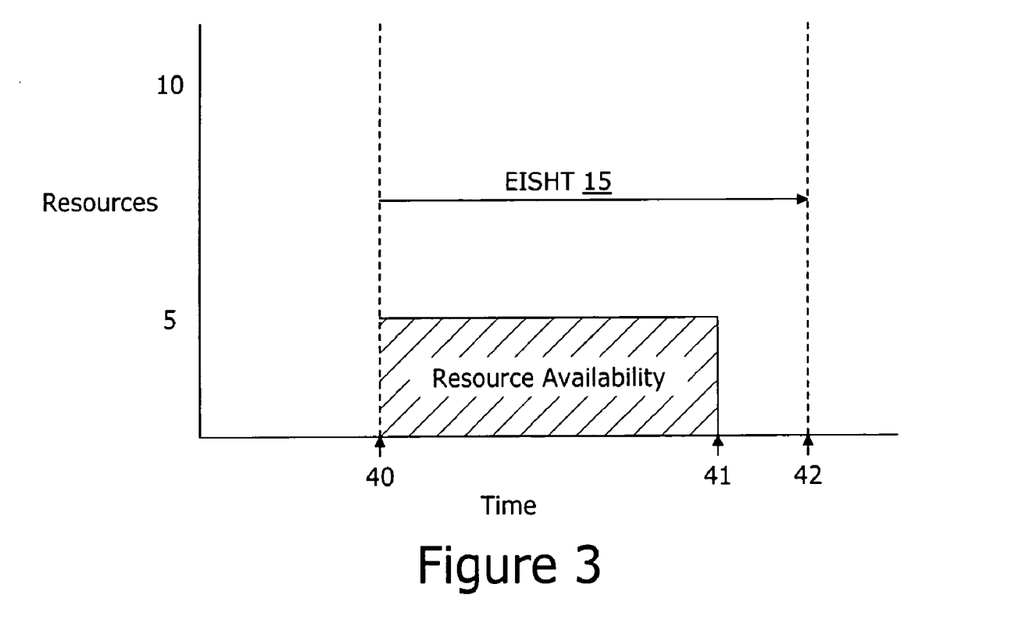
FIG. 3 is a graphical representation of a model for determining whether an expected interim system handling time period exceeds resource availably in accordance with one embodiment of the present invention.

Step 30 represents determining whether the expected interim system handling time period 15 for a subject client exceeds the resource termination time 41. FIG. 3 is a graphic representation of a model for determining whether the expected interim system handling time period 15 exceeds the resource termination time 41. The graph of FIG. 3 plots a quantity of available resources (vertical access) with respect to time (horizontal access). The resource availability data 19 may indicate that at a certain time (the resource termination time 41), resources 20 (or resources 20 within a certain resource group 22) are no longer scheduled to be available for servicing clients.

If the expected interim system handling time period 15 exceeds expected resource availability (e.g time 42 is after the resource termination time 41), the client is placed in the queuing system 34 such that the client is connected to one of the resources 20 as soon as the client is positioned in the queue for handling by one of the resources 20 and a resource becomes available for handling the client. Placing the subject client in the queuing system 34 is represented by step 31 of FIG. 2.

If the expected interim system handling time period does not exceed the expected resource availability (e.g time 42 is before the resource termination time 41), the subject client's connection is coupled to the interim system 14 for handling. Coupling to the interim system 14 is represented by step 32 in FIG. 2.

It should be appreciated that when a subject client is placed in queue, the client is connected to one of the resources 20 as quickly as the queuing system 34 enables such connection independent of the expected interim system handling time period 15. In many cases, the client will be connected to one of the resources 20 within a time duration less than the interim system handling time period 15. However, when a client is handled by the interim system 14, the client is not connected to a resource until completion of handling by the interim system 14 independent of the time it would have taken the client to be connected to an available resource 20 had the client waited in queue.

In an exemplary embodiment, when a subject client is transferred to the interim system 14 for handling, the subject client may be asked by the interim system 14 to choose to wait in queue for an available one of the resources 20 or to take advantage of the services of the interim system 14. If the subject client elects to hold in queue, the interim system 14 may transfer the subject client to the queuing system 34 for holding in queue as represented by arrow 21 of FIG. 1. If the subject client elects to take advantage of the services of the interim system 14, the interim system 14, at a future time, may provide a priority connection to one of the resources 20 for handling as represented by arrow 13 of FIG. 1. The priority connection 13 may be directly to an available one of the resources 20 (e.g the interim system 14 establishes a connation to the resource) or may be to the queuing system 34 with an instruction to connect the subject client to an available one of the resources 20 with priority over other clients holding in queue.

Further yet, in an exemplary embodiment, if a client is holding in queue and chooses to be handled by the interim system 14, the queue management system 12 may operate as discussed with respect to FIG. 2 to determine whether the interim system is to be made available to the subject client.

Call Back System as Exemplary Interim System

Figure 4:
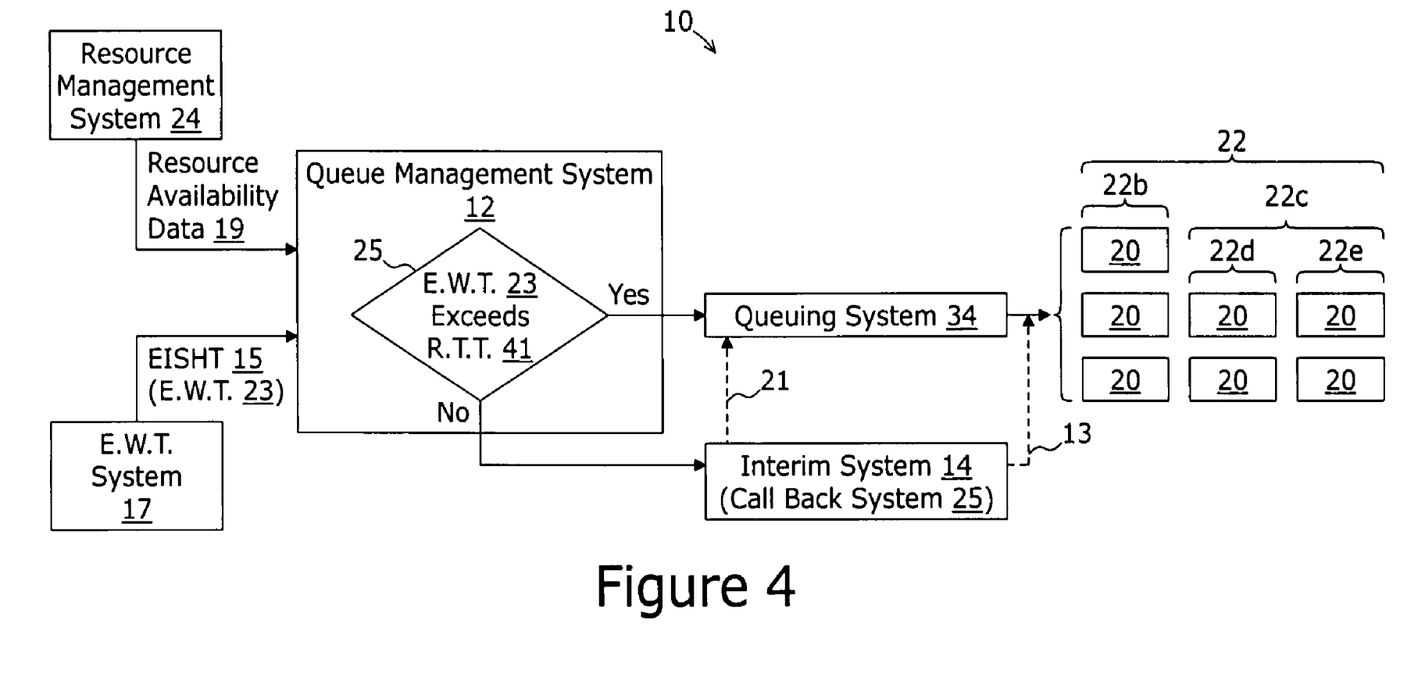
FIG. 4 is a block diagram representing an exemplary architecture for a system that includes a queue management system and the interim system is a call back system in accordance with one embodiment of the present invention

FIG. 4 represents an exemplary system 10 wherein the interim system 14 is a call back system 25. In this example, the expected interim system handling time period 15 maybe an expected wait time period 23 provided by an expected wait time system 17. The expected wait time period 23 represents a time duration between the time the expected wait time value is calculated or effective (the effective time 40 of FIG. 3) and a time at which resources 20 are expected to be available to service the client (expected connection time 42 of FIG. 3).

The expected wait time system 17 may be part of the interim system 14, part of the queue management system 12, part of an automated call director, or part of a separate accessory system.

The expected wait time period 23 may represent an estimated wait time calculated using traditional estimated wait time techniques. Alternatively, the expected wait time period 23 may be a function of both a traditional estimated wait time calculation and a wait time augmentation calculation made based on resource availability and/or scheduled change in resource availability as disclosed on co pending patent application Ser. No. 11/143,857 filed on Jun. 2, 2005 and assigned to the same assignee as the present invention. Such patent application is incorporate herein by reference.

Figure 5A:
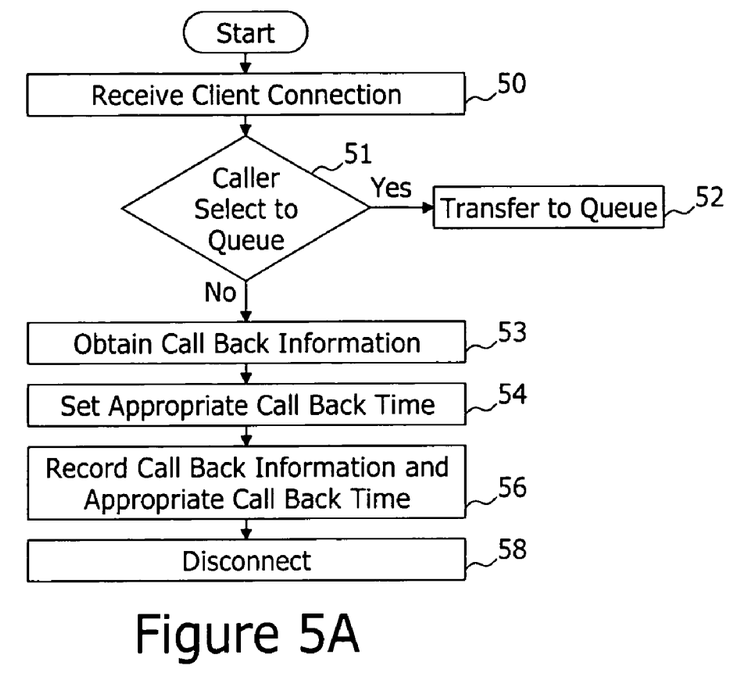
FIG. 5a is a flow chart representing one aspect of operation of an interim system in accordance with one embodiment of the present invention.
Figure 5B:
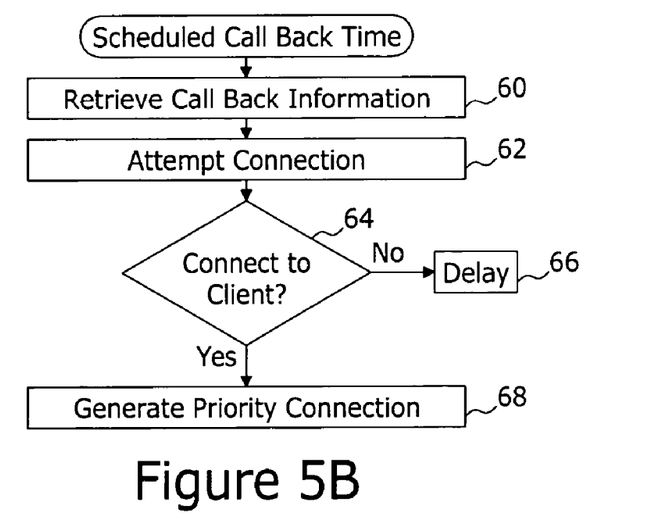
FIG. 5b is a flow chart representing another aspect of operation of an interim system in accordance with one embodiment of the present invention.

The flow charts of FIGS. 5a and 5b represent exemplary operation of a call back system 25. More specifically, the flow chart of FIG. 5a represents exemplary steps performed by the call back system 25 upon receiving a client connection. Referring to FIG. 5a in conjunction with FIG. 4, Step 50 represents receiving the client connection and step 50 corresponds to step 32 of FIG. 2.

Step 51 represents obtaining the subject client's selection to either wait in queue or take advantage of the call back system 25. If the subject client elects to wait in queue, the subject client is transferred to the queuing system 34 at step 52—which corresponds to arrow 21 in FIG. 4.

If the subject client elects to take advantage of the call back system 25, the call back system 25 obtains call back information at step 53. The call back information may include a telephone number to which the call back system can call the subject client at a time derived from the expected wait time 23 (or a scheduled call back time).

The call back information may include a telephone number and may include other information to assure that the call back system may connect to the subject client at the appropriate call back time. The telephone number may be obtained by prompting the subject client to enter a telephone number using the telephone keypad (obtained by DTMF tone), obtained by automatic speech recognition (ASR), capture of the caller ID data from the connection when the subject client called the system 10; or a combination thereof.

Step 54 represents determining the appropriate call back time. In one embodiment, the appropriate call back time is the expected connection time 42 (FIG. 3) or a time derived there from. However, it is envisioned that an appropriate call back time may be selected by the subject client at any time after the expected connection time 42 and at a time wherein resources are scheduled to be available.

Step 56 represents recording the call back information and the appropriate call back time and step 58 represents disconnecting from the subject client.

Figure 6:
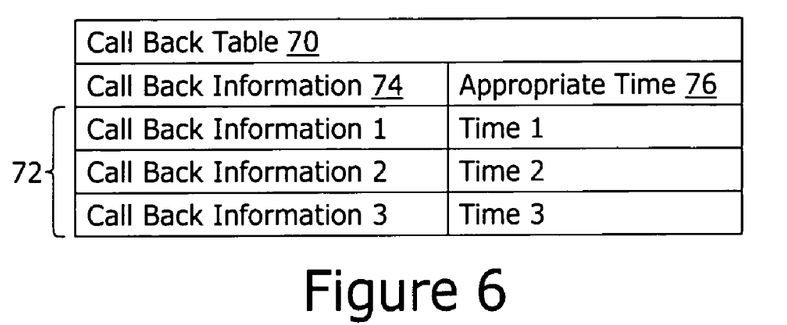
FIG. 6 is a table representing exemplary storage of call back information in accordance with one aspect of the present invention.

In an exemplary embodiment, the call back information and the appropriate call back time are recorded in a call back table 70 as represented by FIG. 6.

Turning briefly to FIG. 6, the call back table 70 includes a plurality of records 72. Each record comprises a field for storing the call back information 74 associated with a subject client and a field storing the appropriate call back time 76.

The call back system 25 monitors the passage of time and upon determining that time has advanced to the appropriate call back time 76 of one of the records 72 of the call back table 70, a call is processed and a connection to the subject client is established. The flow chart of FIG. 5b represents exemplary steps performed by the call back system when time advances to the appropriate call back time 76 of one of the records 72 of the call back table 70.

Referring to FIG. 5b in conjunction with FIG. 6, step 60 represents retrieving the call back information 74 from the record 72 and step 62 represents attempting to establish a connection to the subject client using the call back information 74.

If the connection is not established (at decision box 64), a delay 66 is initiated and the call back system 25 again attempts to establish a connection at step 62. Although FIG. 5b shows an endless loop if a connection is not established, such representation is for clarity of the drawings only. After a certain time duration or after a certain number of connection attempts, the system will cease connection attempts.

If a connection is established, the call back system 25 generates the priority connection 13 at step 68. As previously discussed, in one embodiment, the priority connection 13 may be a transfer of the client to the queuing system 34 with a command such that the queuing system 34 connects the client to the next available one of the resources 20 within the required resource group 22 (e.g. places the client at the front of the queue). In another embodiment, the priority connection 13 may be a connection directly to the next available resources 20 within the required resource group 22 (e.g. bypass of the queuing system 34).

Resource Management System

The resource management system 24 provides resource availability data 19 to the queue management system 12. In general, the resource management system 24 is a known software application used for scheduling working hours of service representatives who operate the resources 20. Typically, the start time, end time, and break times of each service representative are scheduled by a resource management system 24 based on historic need for resources 20. A full discussion of the resource management system 24 and its operation is not relevant to the scope of the present invention.

Figure 7:
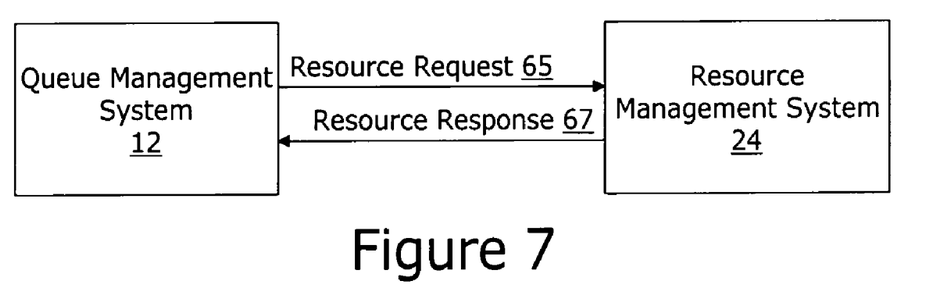
FIG. 7 is a block diagram representing an exemplary communication between a queue management system and a resource management system in accordance with one embodiment of the present invention.

In one embodiment of the present invention, with reference to FIG. 7, the queue management system 12 may make a resource availability request 65 to an exposed application interface of the resource management system 24 and receive the resource availability response 67 (which includes resource availability data 19) as a response to the resource availability request 65. In this embodiment, step 28 of FIG. 2

(get resource availability data) corresponds to the queue management system 12 making a resource availability request 65 and receiving a resource availability response 67.

Example of Use with an ACD

Figure 8:
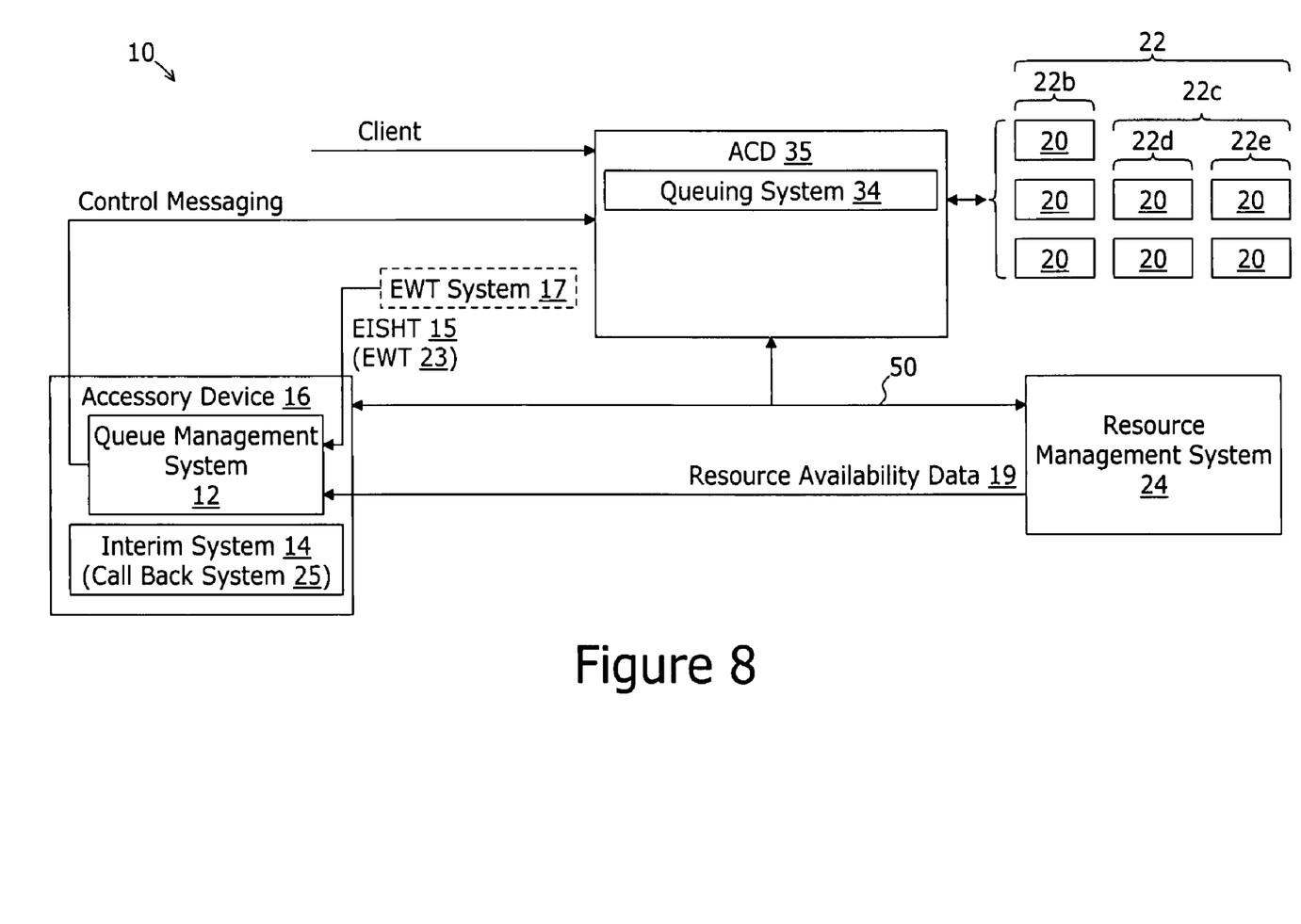
FIG. 8 is a block diagram representing an exemplary embodiment of the present invention in a system which includes an automated call director.

The block diagram of FIG. 8 represents an example of the present invention wherein the queue management system 12 and the interim system 14 are embodied in an accessory device 16 to an automated call director (ACD) 35.

The ACD 35 includes the queuing system 34 and other known ACD technology for receiving an incoming call from a client (e.g. the client connection) and queuing client connections for connection to resources 20 and, when one of the resources 20 becomes available, connecting a client from the queuing system 34 to the available one of the resources 20. The queuing system 34 may be an application which maintains listings or queues related to: i) the order in which clients have connected to the ACD 35; and ii) the resource group 22 which is to handle the request of the client.

The accessory device 16 comprises the queue management system 12, the interim system 14, an interface for obtaining resource availability data 19 from the resource management system 24, and an interface for receiving the value representing the expected interim system handling time period 15—which, if the interim system 14 is a call back system 25, may be an expected wait time period 23 provided by an expected wait time system 17.

In FIG. 8, the expected wait time system 17 is shown as an independent box, however, it is envisioned that the expected wait time system 17 may be part of the ACD 35, may be part of the accessory device 16, or may be an independent system.

It should be appreciated that each of the above discussed interfaces may be the logical exchange of information over one or more data communications networks 50 which interconnect the accessory device 16 to the expected wait time system 17 and the resource management system 24.

In summary, it should be appreciated that the systems of the present invention provide determining whether an interim system is available for servicing clients based on resource availability, and/or a scheduled change in resource availability, in a system wherein both a traditional queue and the interim system are available for handling of clients waiting to be connected to a resource.

Although the invention has been shown and described with respect to certain exemplary embodiments, it is obvious that equivalents and modifications will occur to others skilled in the art upon the reading and understanding of the specification.

For example, in FIG. 8, the accessory device 16 is shown separate from the ACD 35. However, it is envisioned the accessory device 16 (or the functionality of the accessory device 16) may be embodied in the ACD 35 or operate on hardware in conjunction with the ACD 35.

The present invention includes all such equivalents and modifications, and is limited only by the scope of the following claims.

What is claimed is:

1. A queue management system for interfacing with a resource management system and a queuing system, to make an interim system available to clients based on resource availability data and/or a scheduled change in resource availability, the queue management system comprising: an interface to the resource management system for obtaining resource availability data, the resource availability data representing a resource termination time; and a management system for: obtaining a value representing an expected interim system handling time period, the expected interim system handling time period representing a time period that is expected to elapse before an interim system completes its handling of a subject client; and making an interim system available for handling the subject client only if the expected interim system handling time period terminates prior to the resource termination time.

2. The queue management system of claim 1, wherein:
the expected interim system handling time period is an expected wait time period associated with a subject client, the expected wait time period being a time period that is expected to elapse before the subject client is connected to a resource for servicing; and
the interim system is a call back system which:
processes a call to establish a connection to the subject client at a call back time derived from the expected wait time period; and
provides a priority connection to a resource for handling.

3. The queue management system of claim 1, wherein:
the expected interim system handling time period is an expected wait time period associated with a subject client, the expected wait time period being a time period that is expected to elapse before the subject client is connected to a resource for servicing; and
the interim system is a call back system which:
upon client request to hold in queue, transfers the subject client to the queuing system to hold while waiting for connection to a resource for handling;
upon client request for interim handling:
processes a call to establish a connection to the subject client at a call back time derived from the expected wait time period; and
provides for priority connection to a resource for handling.

4. The queue management system of claim 1, wherein the management system further provides for:
transferring the subject client to a queuing system to hold while waiting for connection to a resource for handling upon determining that the resource termination time is scheduled to occur prior to termination of the expected interim system handling time period.

5. The queue management system of claim 4, wherein:
the expected interim system handling time period is an expected wait time period associated with a subject client, the expected wait time period being a time period that is expected to elapse before the subject client is connected to a resource for servicing; and
the interim system is a call back system which:
processes a call to establish a connection to the subject client at a call back time derived from the expected wait time period; and
provides a priority connection to a resource for handling.

6. The queue management system of claim 4, wherein:
the expected interim system handling time period is an expected wait time period associated with a subject client, the expected wait time period being a time period that is expected to elapse before the subject client is connected to a resource for servicing; and
the interim system is a call back system which:
upon client request to hold in queue, transfers the subject client to the queuing system to hold while waiting for connection to a resource for handling;
upon client request for interim handling:
processes a call to establish a connection to the subject client at a call back time derived from the expected wait time period; and
provides for priority connection to a resource for handling.

7. A method for connecting a subject client to a resource by make an interim system available to clients based on resource availability data and/or a scheduled change in resource availability, the method comprising: receiving a connection request from the subject client; obtaining resource availability data, the resource availability data representing a resource termination time; obtaining a value representing an expected interim system handling time period, the expected interim system handling time period representing a time period that is expected to elapse before an interim system completes its handling of a subject client; and making an interim system available for handling the subject client only if the expected interim system handling time period terminates prior to the resource termination time.

8. The method of claim 7, wherein:
the expected interim system handling time period is an expected wait time period associated with a subject client, the expected wait time period being a time period that is expected to elapse before a subject client is connected to a resource for servicing; and
the interim system is a call back system which performs the following steps:
processes a call to establish a connection to the subject client at a call back time derived from the expected wait time period; and
provides a priority connection to a resource for handling.

9. The method of claim 7, wherein:
the expected interim system handling time period is an expected wait time period associated with a subject client, the expected wait time period being a time period that is expected to elapse before a subject client is connected to a resource for servicing; and
the interim system is a call back system which:
upon client request to hold in queue, transfers the subject client to the queuing system to hold while waiting for connection to a resource for handling;
upon client request for interim handling:
processes a call to establish a connection to the subject client at a call back time derived from the expected wait time period; and
provides for priority connection to a resource for handling.

10. The method of claim 7, further comprising:
transferring the subject client to a queuing system to hold while waiting for connection to a resource for handling upon determining that the resource termination time is scheduled to occur prior to termination of the expected interim system handling time period.

11. The method of claim 10, wherein:
the expected interim system handling time period is an expected wait time period associated with a subject client, the expected wait time period being a time period that is expected to elapse before a subject client is connected to a resource for servicing; and
the interim system is a call back system which performs the following steps:
processes a call to establish a connection to the subject client at a call back time derived from the expected wait time period; and
provides a priority connection to a resource for handling.

12. The method of claim 10, wherein:
the expected interim system handling time period is an expected wait time period associated with a subject client, the expected wait time period being a time period that is expected to elapse before a subject client is connected to a resource for servicing; and
the interim system is a call back system which:
upon client request to hold in queue, transfers the subject client to the queuing system to hold while waiting for connection to a resource for handling;
upon client request for interim handling:
processes a call to establish a connection to the subject client at a call back time derived from the expected wait time period; and
provides for priority connection to a resource for handling.

13. A queue management system for operation with a resource management system and a queuing system to make an interim system available to clients based on resource availability data and/or a scheduled change in resource availability, the queue management system comprising: an interface to the resource management system for obtaining resource availability data, the resource availability data representing a resource termination time; and a management system for: obtaining a value representing an expected interim system handling time period, the expected interim system handling time period being a time period that is expected to elapse before an interim system completes its handling of a subject client; coupling the subject client to a queue of the queuing system for waiting for connection to a resource for handling upon determining that the resource termination time is scheduled to occur prior to termination of the expected interim system handling time period; and coupling the subject client to an interim system for handling upon determining that the expected interim system handling time period is expected to elapse prior to resource termination time.

14. The queue management system of claim 13, further comprising an interim system, the interim system
upon client request to hold in queue, transfers the subject client to the queuing system to hold while waiting for connection to a resource for handling;
upon client request for interim handling, provides for priority connection to a resource for handling upon completion of handling by the interim system.

15. The queue management system of claim 14, wherein
the expected interim system handling time period is an expected wait time period associated with a subject client, the expected wait time period being a time period that is expected to elapse before a subject client is connected to a resource for servicing; and
the interim system is a call back system which:
monitors the passage of time;
processes a call to establish a connection to the subject client at a call back time derived from the expected wait time period; and
provides a priority connection to a resource for handling.

16. A queue management system for operation with a resource management system and an automated call director to make an interim system available to clients based on resource availability data and/or a scheduled change in resource availability, the queue management system comprising: an interface to the resource management system for obtaining resource availability data, the resource availability data representing a resource termination time; and a management system for: obtaining a value representing an expected interim system handling time period, the expected interim system handling time period being a time period that is expected to elapse before an interim system completes its handling of a subject client; coupling the subject client to a queue of the automated call director for waiting for connection to a resource for handling upon determining that the resource termination time is scheduled to occur prior to termination of the expected interim system handling time period; and coupling the subject client to an interim system for handling upon determining that the expected interim system handling time period is expected to elapse prior to the resource termination time.

17. The queue management system of claim 16, further comprising the interim system, the interim system
   upon client request to hold in queue, transfers the subject client to the automated call director to hold while waiting for connection to a resource for handling;
   upon client request for interim handling, provides for priority connection to a resource for handling upon completion of handling by the interim system.

18. The queue management system of claim 17, wherein
   the expected interim system handling time period is an expected wait time period associated with a subject client, the expected wait time period being a time period that is expected to elapse before a subject client is connected to a resource for servicing; and
   the interim system is a call back system which:
      monitors the passage of time;
      processes a call to establish a connection to the subject client at a call back time derived from the expected wait time period; and
      provides a priority connection to a resource for handling.

19. The queue management system of claim 1, wherein the resource termination time is indicative of when a resource is no longer scheduled to be available to clients due to start time, end time, and/or break time of resources.

20. The method of claim 7, wherein obtaining resource availability data includes obtaining resource availability data representing a resource termination time that is indicative of when a resource is no longer scheduled to be available to clients due to start time, end time, and/or break time of resources.

21. The queue management system of claim 13, wherein the resource termination time is indicative of when a resource is no longer scheduled to be available to clients due to start time, end time, and/or break time of resources.

22. The queue management system of claim 16, wherein the resource termination time is indicative of when a resource is no longer scheduled to be available to clients due to start time, end time, and/or break time of resources.

* * * * *